US007774129B2

(12) United States Patent
Washio

(10) Patent No.: US 7,774,129 B2
(45) Date of Patent: Aug. 10, 2010

(54) START CONTROL DEVICE FOR VEHICLE AND METHOD FOR CONTROLLING SAME

(75) Inventor: Yoshikata Washio, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 281 days.

(21) Appl. No.: 12/111,354

(22) Filed: Apr. 29, 2008

(65) Prior Publication Data

US 2008/0281506 A1 Nov. 13, 2008

(30) Foreign Application Priority Data

May 8, 2007 (JP) ............................ 2007-123928

(51) Int. Cl.
*G06F 19/00* (2006.01)
*F02N 11/08* (2006.01)

(52) U.S. Cl. .................................... 701/113; 123/179.3

(58) Field of Classification Search .............. 123/179.1, 123/179.3, 179.16–179.18, 179.25, 491, 123/DIG. 8; 701/113, 115; 74/6; 290/38 R
See application file for complete search history.

(56) References Cited

U.S. PATENT DOCUMENTS 7,208,918 B2 * 4/2007 Shirakawa et al. ............ 322/99
7,216,614 B2 * 5/2007 Shibata et al. ......... 123/179.17
7,409,856 B2 * 8/2008 Brott et al. ............... 73/114.77
2006/0107932 A1 * 5/2006 Shibata et al. ......... 123/179.17
2009/0271098 A1 * 10/2009 Hosaka ....................... 701/113

FOREIGN PATENT DOCUMENTS

JP 08-296492 A 11/1996
JP 2000-154749 A 6/2000
JP 2001-173490 A 6/2001

* cited by examiner

*Primary Examiner*—Willis R Wolfe, Jr.
(74) *Attorney, Agent, or Firm*—Sughrue Mion, PLLC

(57) ABSTRACT

The start control device for a vehicle has previously stored a plurality of coolant temperature maps in association with information on a plurality of engines in which determination rotational speeds for use in determining whether or not the each engine has achieved complete combustion are determined for several different engine coolant temperatures. The start control device for a vehicle starts cranking when detecting a signal from an engine starting switch, selects a coolant temperature map associated with engine information acquired out of the plurality of coolant temperature maps, determines a determination rotational speed NE determined for the coolant temperature at start in the selected coolant temperature map, and terminates the cranking when the engine rotational speed reaches the determination rotational speed NE.

8 Claims, 5 Drawing Sheets

FIG. 3A

| ENGINE COOLANT TEMPERATURE (°C) | −40 | −20 | 0 | 80 | 90 | 100 |
|---|---|---|---|---|---|---|
| DETERMINATION ROTATIONAL SPEED NE (rpm) | 1000 | 900 | 700 | 500 | 500 | 500 |

FIG. 3B

| ENGINE COOLANT TEMPERATURE (°C) | −40 | −20 | 0 | 80 | 90 | 100 |
|---|---|---|---|---|---|---|
| DETERMINATION ROTATIONAL SPEED NE (rpm) | 800 | 700 | 500 | 400 | 400 | 400 |

FIG. 3C

| ENGINE COOLANT TEMPERATURE (°C) | −40 | −20 | 0 | 80 | 90 | 100 |
|---|---|---|---|---|---|---|
| DETERMINATION ROTATIONAL SPEED NE (rpm) | 1200 | 1200 | 1200 | 1200 | 1200 | 1200 |

FIG. 3D

| ENGINE COOLANT TEMPERATURE (°C) | −40 | −20 | 0 | 80 | 90 | 100 |
|---|---|---|---|---|---|---|
| DETERMINATION ROTATIONAL SPEED NE (rpm) | 1200 | 1200 | 1000 | 800 | 800 | 800 |

START CONTROL DEVICE FOR VEHICLE AND METHOD FOR CONTROLLING SAME

INCORPORATION BY REFERENCE

The disclosure of Japanese Patent Application No. 2007-123928 filed on May 8, 2007 including the specification, drawings and abstract is incorporated herein by reference in its entirety.

BACKGROUND OF THE INVENTION

1. Field of the Invention

The present invention relates to a start control device for a vehicle and a method for controlling the start control device for a vehicle. In particular, the present invention relates to a start control device for a vehicle in which a cranking hold control operation is performed and a method for controlling the start control device for a vehicle.

2. Description of the Related Art

A start control device for a vehicle is generally known which, when the driver carries out a starting operation, performs a cranking hold control operation including the steps of supplying electric power to a starter motor to cause it to start cranking of the engine and continuing the cranking until the engine rotational speed reaches a predetermined rotational speed for use in determining whether or not the engine has achieved complete combustion (hereinafter, called "complete combustion determination rotational speed") in order to improve the starting performance of the engine.

Conventionally, in a vehicle provided with this type of a start control device for a vehicle, the starting operation is usually carried out using a push-type start button (which is hereinafter referred to simply as "start button"), and the cranking hold control operation as described above is performed when the start button is pressed.

As one start control device for a vehicle which determines whether or not complete combustion has been achieved based on a predetermined complete combustion determination rotational speed, a start control device is disclosed having; cranking determination means for determining whether or not the engine is being cranked; complete combustion determination means for determining whether or not the engine has achieved complete combustion; engine temperature detection means for detecting engine coolant temperature; engine rotational speed detection means for detecting engine rotational speed; basic injection amount determination means for determining a basic starting fuel injection amount based on the detected engine coolant temperature and engine rotational speed; and reduction control means for reducing the basic starting fuel injection amount with time from the time when the cranking determination means determines that the cranking has been completed until the complete combustion determination means determines that the engine has achieved complete combustion, in which the complete combustion determination means determines that the engine has achieved complete combustion when the engine rotational speed reaches a predetermined complete combustion determination rotational speed, and in which a larger value is set as the predetermined complete combustion determination rotational speed as the engine coolant temperature is lower (see Japanese Patent Application Publication No. 2001-173490 (P-A-2001-173490), for example).

The start control device for a vehicle disclosed in JP-A-2001-173490 has previously stored a coolant temperature map showing the relation between the engine coolant temperature and the predetermined complete combustion determination rotational speed, and determines a complete combustion determination rotational speed based on the coolant temperature map. Therefore, it can determine whether or not complete combustion has been achieved properly based on the engine coolant temperature at the start of the engine.

However, since different engines have different complete combustion characteristics, the conventional start control device for a vehicle as described above requires a coolant temperature map including complete combustion determination rotational speeds determined for the engine coolant temperatures under the conditions suitable for the complete combustion characteristics of the engine. Therefore, different start control devices are developed for different types of engines. Thus, a large number of development staff and a long developing time are required, resulting in an increase in development costs. Also, since different start control devices developed for different engines require different quality maintenance approaches, the workload of quality inspection places a heavy burden on the inspection staff.

SUMMARY OF THE INVENTION

The present invention provides a start control device for a vehicle which can be used generally in vehicles equipped with different types of engines, and a method for controlling the start control device for a vehicle.

A start control device for a vehicle according to a first aspect of the present invention includes: an operation detection device that detects a signal from an engine starting switch for starting a first engine mounted in a vehicle; a rotational speed detection device that detects engine rotational speed of the first engine; a coolant temperature detection device that detects coolant temperature in the first engine; a storage device that stores a first coolant temperature map in which first determination rotational speeds for use in determining whether or not the first engine has achieved complete combustion are determined for several coolant temperatures in the first engine, and a second coolant temperature map in which second determination rotational speeds for use in determining whether or not a second engine has achieved complete combustion are determined for several different coolant temperatures in the second engine; a complete combustion determination device that determines that the first engine is in a complete combustion state when the rotational speed of the first engine reaches one of the first determination rotational speeds that is determined for the coolant temperature detected at the start of the first engine in the first coolant temperature map; a starter motor control device that controls a starter motor to cause the same to crank the first engine from the time when the operation detection device detects the signal until the complete combustion determination device determines that the first engine is in a complete combustion state; and an information acquisition device that acquires first engine information on the first engine. The storage device stores the first coolant temperature map and the second coolant temperature map associated with the first engine information and second engine information, respectively. When the information acquisition device acquires the first engine information, the complete combustion determination device selects the first coolant temperature map associated with the first engine information and determines that the first engine is in the complete combustion state based on the first coolant temperature map.

With the above described configuration, since the start control device for a vehicle according to the first aspect determines whether or hot the complete combustion has been achieved using the first coolant temperature map associated with the first engine information on the first engine mounted in the vehicle among a plurality of coolant temperature maps each stored in association with engine information on a plurality of engines, the start control device for a vehicle according to this aspect can be used generally in vehicles equipped with different types of engines.

In the start control device for a vehicle as described above, the storage device may also store third coolant temperature map in which third determination rotational speeds for use in determining whether or not the first engine has achieved complete combustion are determined for several coolant temperatures in the first engine, the third determination rotational speeds being respectively higher than the first determination rotational speeds, and fourth coolant temperature map in which fourth determination rotational speeds for use in determining whether or not the second engine has achieved complete combustion are determined for several coolant temperatures in the second engine, the fourth rotational speeds being respectively higher than the second determination rotational speeds. The storage device may have stored the third coolant temperature map and the fourth coolant temperature map in association with the first engine information and second engine information, respectively. When the operation detection device has detected the signal for a predetermined period of time or longer and the information acquisition device acquires the first engine information, the complete combustion determination device may select the third coolant temperature map associated with the first engine information out of the first to fourth coolant temperature maps and may determine that the first engine is in the complete combustion state based on the third coolant temperature map.

In the start control device for a vehicle as described above, the starter motor control device may control the starter motor to cause the same to crank the first engine from the time when the signal is detected until the first engine is determined to be in a complete combustion or the signal is no longer detected.

With the above described configuration, when a driver continues a starting operation, the start control device for a vehicle according to the above aspect terminates cranking when the engine rotational speed reaches the third determination rotational speed set higher than the first determination rotational speed or when the driver determines that the engine has achieves complete combustion and terminates the starting operation. Thus, the start control device can properly determine whether or not the first engine has achieved complete combustion properly. This configuration is advantageous when the first engine cannot be started easily because of inferior filet or some other reason.

A second aspect of the present invention is a method for controlling a start control device for a vehicle. A first coolant temperature map in which first determination rotational speeds for use in determining whether or not a first engine mounted in a vehicle has achieved complete combustion are determined for several coolant temperatures in the first engine and a second coolant temperature map in which second determination rotational speeds for use in determining whether or not a second engine has achieved complete combustion are determined for several different coolant temperatures in the second engine are stored in the start control device of the vehicle. The method for controlling a start control device includes: detecting a start command to the first engine; starting cranking of the first engine; acquiring first engine information on the first engine; selecting the first coolant temperature map corresponding to the first engine information out of the first and second coolant temperature maps and determining one of the first complete combustion determination rotational speeds that is corresponding to the coolant temperature at the start of the first engine based on the first coolant temperature map; and terminating the cranking when the rotational speed of the first engine becomes equal to or higher than the one of the first complete combustion determination rotational speeds.

In the method for controlling a start control device for a vehicle according to the second aspect, a third coolant temperature map in which third determination rotational speeds for use in determining whether or not the first engine has achieved complete combustion which are respectively higher than the first determination rotational speeds and a fourth coolant temperature map in which fourth determination rotational speeds for use in determining whether or not the second engine has achieved complete combustion which are respectively higher than the second determination rotational speeds may also be stored in the start control device. The third coolant temperature map may be selected out of the first and third coolant temperature maps corresponding to the first engine information when the duration of a start command for the first engine is longer than a predetermined period of time; one of the third determination rotational speeds that corresponds to the coolant temperature at the start of the first engine may be determined based on the third coolant temperature map; and the cranking may be terminated when the rotational speed of the first engine becomes equal to or higher than the one of the third determination rotational speed.

In the method for controlling a start control device for a vehicle according to the above aspect, it may be determined whether or not the start command to the first engine is being continued when the rotational speed of the first engine is lower than the one of the third determination rotational speeds; and the cranking may be terminated when it is determined that the start command to the first engine is not being continued.

According to the above aspect, the start control device for a vehicle determines whether or not the engine has achieved complete combustion using the first or third coolant temperature map associated with the first engine information on the first engine mounted in the vehicle among a plurality of coolant temperature map stored in association with engine information on a plurality of engines. It is, therefore possible to provide a start control device for a vehicle which can be used generally in vehicles equipped with different types of engines and a method for controlling the start control device for a vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3A is a coolant temperature map of the start control device for a vehicle according to the embodiment of the present invention, a coolant temperature map for use in the case of a short button press and engine information on ENG1;

FIG. 3B is a coolant temperature map for use in the case of a short button press and engine information on ENG2;

FIG. 3C is a coolant temperature map for use in the case of a long button press and engine information on ENG1;

FIG. 3D is a coolant temperature map for use in the case of a long button press and engine information on ENG2;

DETAILED DESCRIPTION OF THE PREFERRED EMBODIMENTS

Figure 1:
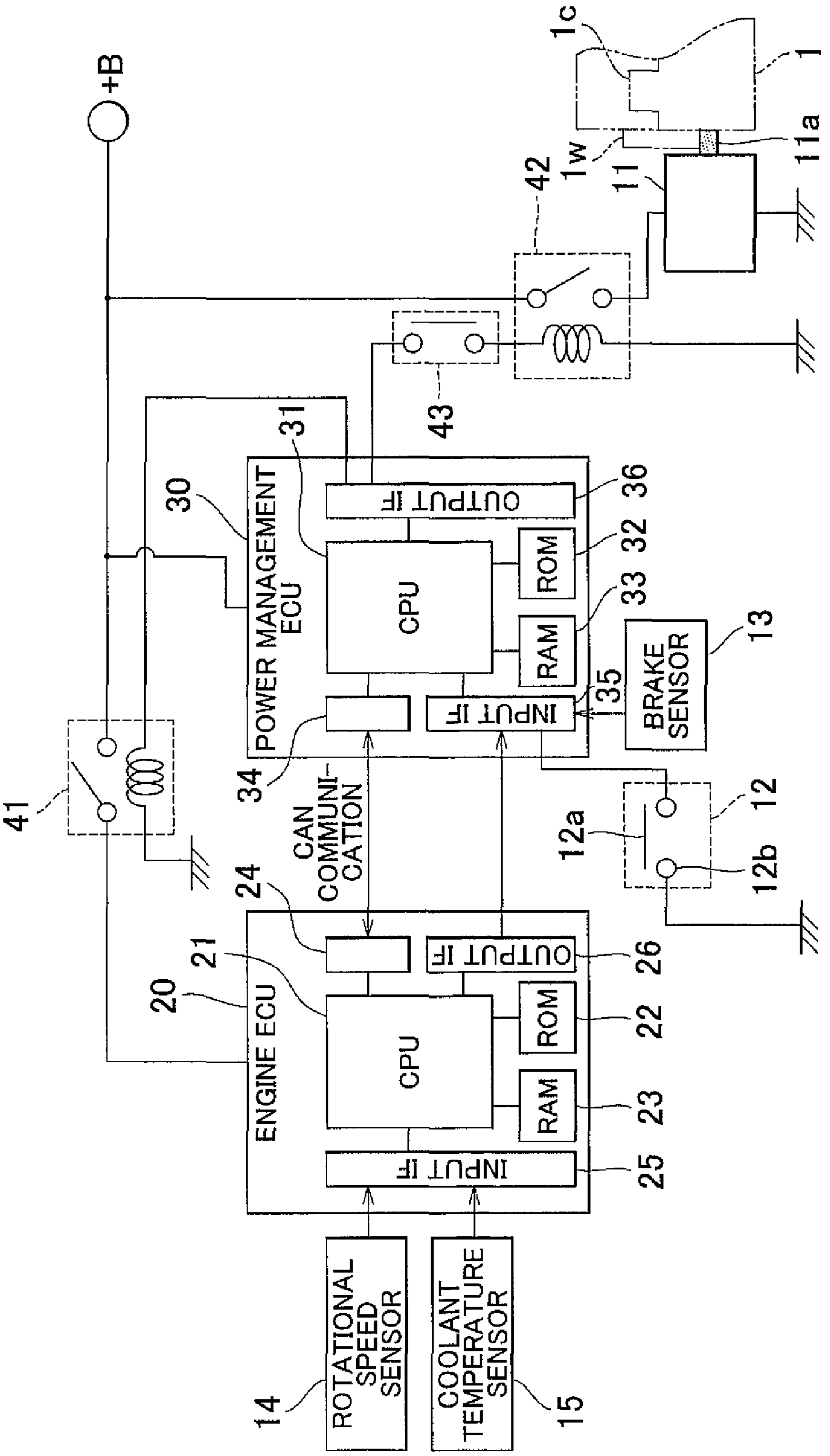
FIG. 1 is a general configuration diagram schematically illustrating a vehicle provided with a power management ECU constituting a start control device for a vehicle according to an embodiment of the present invention.

Description is hereinafter made of an embodiment of the present invention with reference to the drawing.

FIG. 1 is a general configuration diagram schematically illustrating a vehicle provided with a power management ECU constituting a start control device for a vehicle according to an embodiment of the present invention.

The configuration is first described.

As shown in FIG. 1, the vehicle has a starter motor 11 for cranking an engine 1; a start button 12 operable by the driver to start the engine 1; a brake sensor 13 for detecting whether or not the brake is depressed; a rotational speed sensor 14 for sensing rotational speed of the engine 1; a coolant temperature sensor 15 for detecting coolant temperature in the engine 1; an engine ECU (Electronic Control Unit) 20 for controlling the engine 1; and a power management ECU 30 for controlling the start of the engine 1 and performing some other functions.

The starter motor 11, for example, has an output shaft 11*a* having teeth which are removably engageable with eternal teeth (not shown) formed on periphery of a flywheel 1*w* of the engine 1, and can actuate a crankshaft 1*c* in the engine 1 connected to the flywheel 1*w* and valve mechanism, pump and so on operatively connected to the crankshaft 1*c*.

The start button 12, which is constituted of a momentary switch, for example, has an operation part 12*a* which is pushed (pressed down) by the driver and a contact part 12*b*, and outputs a signal representing an ON state while the operation part 12*a* is being pressed down. The start button 12 functions as an engine starting switch of the present invention.

While a brake pedal provided in the vehicle is being operated by the driver, the brake sensor 13 outputs a brake ON signal representing that the brake pedal is being depressed.

The rotational speed sensor 14 is constituted of a crank angle sensor for detecting the rotation of the crankshaft 1*c* of the engine 1 in units of a predetermined angle, and outputs a signal representing the engine rotational speed.

The coolant temperature sensor 15 is constituted of a detection element the resistance of which varies with changes in temperature, and outputs a signal representing the temperature of coolant flowing through a coolant passage in the engine 1 (which is hereinafter referred to as "engine coolant temperature").

The engine ECU 20 is constituted of a microcomputer having a CPU (Central Processing Unit) 21; a ROM (Read Only Memory) 22; a RAM (Random Access Memory) 23; a network interface circuit 24 for communication, such as CAN (Controller Area Network) communication, via an onboard LAN (Local Area Network); and an input interface circuit 25 and an output interface circuit 26 through which various signals are inputted and outputted, respectively.

When the engine ECU 20 is supplied with electric power by the power management ECU 30, which is described later, the CPU 21 performs signal processing according to an engine control program stored previously in the ROM 22 using the temporary storage unction of the RAM 23 to achieve optimum engine control.

In the ROM 22 of the engine ECU 20, engine information on the engine 1, such as the type, specifications etc. of the engine 1, have been previously stored in addition to the engine control program. The engine information is outputted to the power management ECU 30 via the network interface circuit 24 by the CPU 21. Here, the engine information in the present invention is not specifically limited and any information can be used as long as it can be used to distinguish the engine. The storage medium in which the engine information has been previously stored is not limited to the ROM 22 of the engine ECU 20 as long as it is a storage medium provided outside the start control device.

The rotational speed sensor 14 and the coolant temperature sensor 15 are connected to the input interface circuit 25 of the engine ECU 20, and signals outputted from the sensors are inputted through the input interface circuit 25. A signal inputted from the rotational speed sensor 14 is outputted to the power management ECU 30 via the output interface circuit 26 by the CPU 21, and a signal inputted from the coolant temperature sensor 15 is outputted to the power management ECU 30 via the network interface circuit 24 by the CPU 21.

The power management ECU 30 is constituted of a microcomputer having a CPU 31; a ROM 32; a RAM 33; a network interface circuit 34 for communication, such as CAN communication, via the onboard LAN; and an input interface circuit 35 and an output interface circuit 36 through which various signals are inputted and outputted, respectively.

The power management ECU 30 is connected to a battery constituted of a secondary battery such as nickel-hydrogen battery (the plus terminal of which is indicated as "+B" and details are not shown in the drawing), and is always operable by the electric power supplied from the battery. The CPU 31 operates according to a program stored previously in the ROM 32 using the temporary storage function of the RAM 33 to achieve optimum power source switching control and optimum start control for the engine 1 in accordance with the operation from the start button 12.

The engine ECU 20 is connected to the network interface circuit 34, and the engine information on the engine 1 and a signal representing the engine coolant temperature outputted from the engine ECU 20 via the onboard LAN are inputted in the network interface circuit 34.

The start button 12, the brake sensor 13 and the engine ECU 20 are connected to the input interface circuit 35, and a signal representing an ON state of the start button 12, a brake ON signal and a signal representing the engine rotational speed are inputted in the input interface circuit 35.

An engine ECU relay switch circuit 41 for controlling the power supply to the engine ECU 20, a starter motor relay switch circuit 42 for controlling the power supply to the starter motor 11, and an accessory relay switch circuit (not shown) for controlling the power supply to accessory devices mounted in the vehicle such as onboard audio system and navigation system are connected to the output interface circuit 36.

Each of the relay switch circuits 41 and 42 has a relay coil part which is excited by the power management ECU 30, and a contact part which is closed to ON when the relay coil part is excited.

The relay coil part of the starter motor relay switch circuit 42 is connected to the output interface circuit 36 via a neutral switch 43 which is ON when the shift lever is in the neutral or parking position so that the relay coil part cannot be excited when the shift lever is in a position other than the neutral and parking positions.

The ROM 32 of the power management ECU 30 has previously stored therein a plurality of coolant temperature maps each associated with information on one of a plurality of engines, which are described later. The ROM 32 functions as a storage device of the present invention.

The CPU 31 of the power management ECU 30 determines that the start button 12 was pressed for a long period of time when it detects a signal representing an ON state from the start button 12 for a predetermined period of time (three seconds, for example) or longer, and determines that the start button 12 was pressed for a short period of time when a signal representing an ON state from the start button 12 is detected for a period shorter than the predetermined period of time.

The CPU 31 of the power management ECU 30 performs a power source switching control operation to switch the supply state of electric power from the battery based on outputs from the start button 12 and the brake sensor 13.

Figure 2:
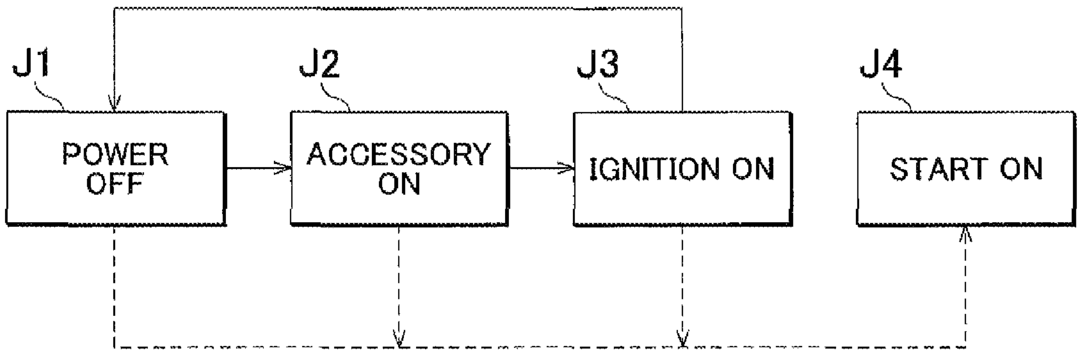
FIG. 2 is a state transition diagram for describing a power source switching control operation according to the embodiment of the present invention.

FIG. 2 is a state transition diagram for describing the power source switching control operation of the power management ECU 30.

As shown in FIG. 2, the CPU 31 of the power management ECU 30 switches the supply state of electric power from the battery among a power OFF mode (J1) in which no electric power is supplied to the other electric load devices mounted in the vehicle, an accessory ON mode (J2) in which electric power is supplied to the accessory devices, an ignition ON mode (J3) in which electric power is supplied to the other electric load devices including the engine ECU in addition to the accessory devices, and an engine start mode (J4) in which electric power is supplied to the starter motor 11 in addition to the devices to which electric power is supplied in the ignition ON mode.

More specifically, the CPU 31 switches the supply state to the accessory ON mode (J2) when the start button 12 is pressed for a short period of time in the power OFF mode (J1), switches the supply state to the ignition ON mode (13) when the start button 12 is pressed for a short period of time in the accessory ON mode (J2), and returns the supply state to the power OFF mode (J1) when the start button 12 is pressed for a short period of time in the ignition ON mode (J3) as indicated by solid line arrows in FIG. 2.

The CPU 31 switches the supply state of electric power from the battery to the engine start mode (J4) when a brake ON signal from the brake sensor 13 is detected simultaneously with the pressing of the start button 12 even if the supply state of electric power from the battery is in any of the modes J1 to J3 as indicated by broken line arrows in FIG. 2.

Referring again to FIG. 1, when the supply state of electric power is switched to the engine start mode as a result of a power source switching control operation, the CPU 31 of the power management ECU 30 determines whether or not a start control operation can be started based on the state of the neutral switch 43. If the CPU 31 determines that a start control operation can be started, the CPU 31 turns on the starter motor relay switch circuit 42 via the output interface circuit 36 to supply electric power to the starter motor 11, and performs a cranking hold control operation.

When the CPU 31 of the power management ECU 30 determines that the engine 1 has reached a complete combustion state based on the engine information, signals representing the engine rotational speed and the engine coolant temperature inputted from the network interface circuit 34 and the input interface circuit 35, and a specific coolant temperature map stored in the ROM 32, the CPU 31 turns off the starter motor relay switch circuit 42 via the output interface circuit 36 and terminates the cranking hold control operation. Here, the CPU 31 regards the engine 1 as having achieved complete combustion and determines that the engine 1 is in a complete combustion state when the engine rotational speed reaches a complete combustion determination rotational speed, which is described later.

The CPU 31 of the power management ECU 30 determines whether or not the engine is in a complete combustion state based on various signals inputted thereinto, and keeps the starter motor relay switch circuit 42 ON until the engine reaches a complete combustion state. That is, the CPU 31 can be regarded as complete combustion determination device and starter motor control device of the present invention.

The CPU 31 of the power management ECU 30 detects a signal outputted from the start button 12 and representing an ON state and a signal outputted from the engine ECU 20 and representing the engine rotational speed via the input interface circuit 35. That is, the CPU 31 can be regarded as operation detection device and rotational speed detection device of the present invention.

The CPU 31 of the power management ECU 30 acquires the engine information on the engine 1 and detects a signal representing the engine coolant temperature, both of which are outputted from the engine ECU 20 via the network interface circuit 34. That is, the CPU 31 can be regarded as information acquisition device and coolant temperature detection device of the present invention.

The power management ECU 30 configured as described above functions as the start control device for a vehicle according to the present invention.

FIGS. 3A to 3D are coolant temperature maps of the start control device for a vehicle according to the embodiment of the present invention. FIG. 3A is a coolant temperature map for use in the case of a short button press and engine information on ENG1, FIG. 3B is a coolant temperature map for use in the case of a short button press and engine information on ENG2, FIG. 3C is a coolant temperature map for use in the case of a long button press and engine information on ENG1, and FIG. 3D is a coolant temperature map for use in the case of a long button press and engine information on ENG2.

As shown in FIGS. 3A to 3D, each of the coolant temperature maps is a maps in which determination rotational speeds NE are determined for several different engine coolant temperatures. The CPU 31 refers to one of the coolant temperature maps to define a determination rotational speed as a threshold value of the engine rotational speed for use in determining whether or not the engine has achieved complete combustion. Hereinafter, the determination rotational speed is called complete combustion determination rotational speed.

As shown in FIG. 3A and FIG. 3B, complete combustion determination rotational speeds NE for use in a normal cranking hold control operation are determined for several different engine coolant temperatures in each coolant temperature map for use in the case of a short button press. As shown in FIG. 3C and FIG. 3D, complete combustion determination rotational speeds NE for use in a cranking hold control operation which is performed when the engine 1 cannot achieve complete combustion easily because of inferior fuel or some other reason are determined in each coolant temperature map for use in the case of a long button press.

The complete combustion determination rotational speeds determined in each coolant temperature map for use in the case of a long button press are respectively higher than those determined for the same engine coolant temperatures in the coolant temperature map for use in the case of a short button press and associated with the same engine information.

In addition to the maps shown in FIGS. 3A to 3D, coolant temperature maps for use in the case of a short button press and coolant temperature maps for use in the case of a long button press which have been prepared for the other engines and which meet requirements of the corresponding engines have been previously stored in the ROM 32 of the power management ECU 30.

The operation is next described.

Figure 4:
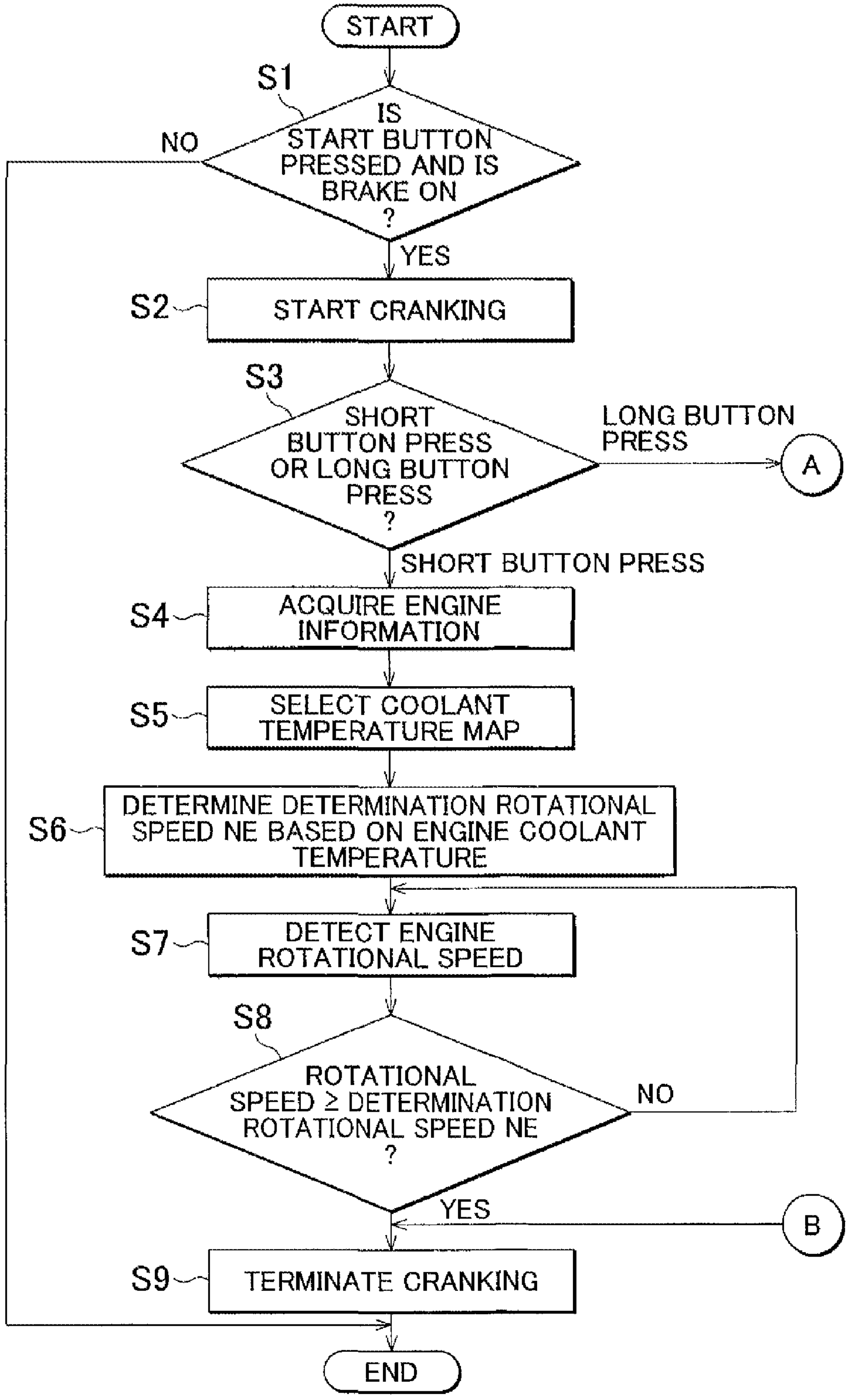
FIG. 4 is a flowchart illustrating the operation of the start control device for a vehicle according to the embodiment of the present invention.
Figure 5:
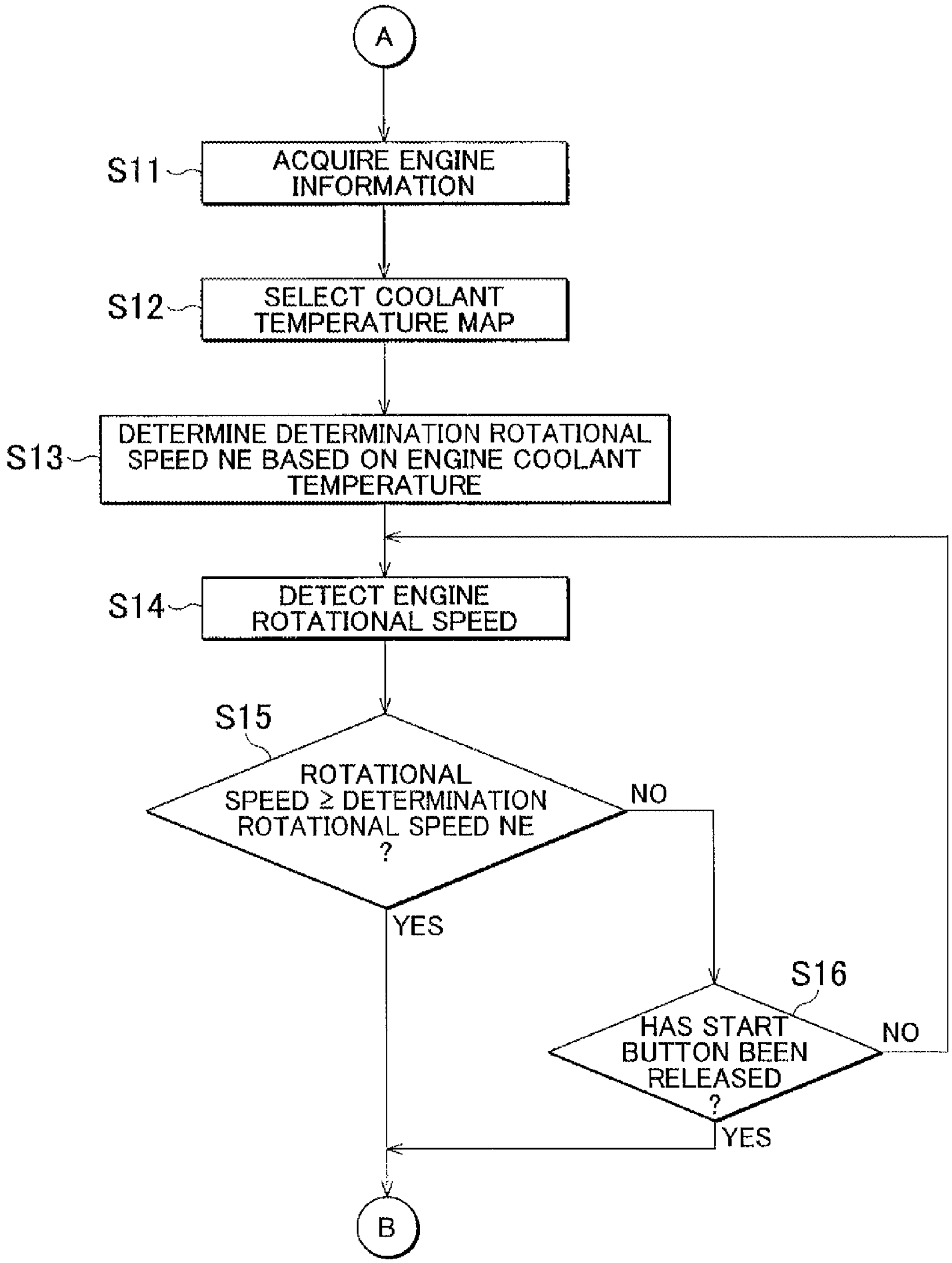
FIG. 5 is a flowchart continuing from FIG. 4.

FIG. 4 is a flowchart illustrating the operation of the start control device for a vehicle according to the embodiment of the present invention, and FIG. 5 is a flowchart continuing from FIG. 4.

The operation described below is accomplished by a program stored previously in the ROM 32 of the power management ECU 30 and performed by the CPU 31.

As shown in FIG. 4, the CPU 31 first determines whether or not an ON signal from the brake sensor 13 is detected simultaneously with the pressing of the start button 12 (step S1).

If an ON signal from the brake sensor 13 is not detected simultaneously with the pressing of the start button 12, the CPU 31 terminates the routine.

If an ON signal from the brake sensor 13 is detected simultaneously with the pressing of the start button 12, the CPU 31 switches the supply state of electric power to the engine start mode to start cranking of the engine 1 (step S2). That is, if the neutral switch 43 is ON, the CPU 31 turns on the starter motor relay switch circuit 42 to drive the starter motor 11 and the starter motor 11 in turn starts rotating the crankshaft 1*c* in the engine 1 via the output shaft 11*a*.

Next, the CPU 31 determines whether the period for which the start button 12 was pressed detected in step S1 is short or long (step S3).

If it is determined that the start button 12 was pressed for a short period of time, the CPU 31 acquires the engine information on the engine 1 outputted from the engine ECU 20 via the network interface circuit 34 (step S4).

Then, the CPU 31 selects a coolant temperature map for use in the case of a short button press stored in the ROM 32 in association with the engine information acquired in step S4 (step S5). For example, the CPU 31 selects the coolant temperature map shown in FIG. 3A when the engine information acquired in step S4 represents ENG1, and selects the coolant temperature map shown in FIG. 3B when the engine information acquired in step S4 represents ENG2.

The CPU 31 next detects a signal outputted from the engine ECU 20 and representing the engine coolant temperature via the network interface circuit 34, and determines a complete combustion determination rotational speed NE determined for the engine coolant temperature represented by the detected signal based on the coolant temperature map selected in step S5 (step S6). For example, if the engine information represents ENG1 and the engine coolant temperature is 0° C., the complete combustion determination rotational speed NE is determined to 700 rpm with reference to the coolant temperature map shown in FIG. 3A. If the engine information represents ENG2 and the engine coolant temperature is 80° C., the complete combustion determination rotational speed NE is determined to 400 rpm with reference to the coolant temperature map shown in FIG. 3B. Here, since the engine 1 has not been started yet, the engine coolant temperature detected in step S6 can be regarded as the coolant temperature detected at the start of the engine in the present invention.

Next, the CPU 31 detects a signal outputted from the engine ECU 20 and representing the engine rotational speed via the input interface circuit 35 (step S7), and determines whether or not the engine rotational speed represented by the detected signal is equal to or higher than the complete combustion determination rotational speed NE determined in step S6 (step S8).

If the engine rotational speed is lower than the complete combustion determination rotational speed NE, the CPU 31 performs steps S7 to S8 again.

On the other hand, if the engine rotational speed is equal to or higher than the complete combustion determination rotational speed NE, the CPU 31 determines that the engine 1 has reached a complete combustion state, and terminates cranking of the engine 1 (step S9). That is, the CPU 31 turns off the starter motor relay switch circuit 42 to stop the starter motor 11.

This is the end of the process which is executed when it is determined that the start button 12 was pressed for a short period of time in step S3.

The process the CPU 31 executes when it is determined that the start button 12 was pressed for a long period of time in step S3 is next described with reference to FIG. 5.

As shown in FIG. 5, if it is determined that the start button 12 was pressed for a long period of time, the CPU 31 acquires the engine information on the engine 1 outputted from the engine ECU 20 via the network interface circuit 34 (step S11).

Then, the CPU 31 selects a coolant temperature map for use in the case of a long button press stored in the ROM 32 in association with the engine information acquired in step S11 (step S12). For example, the CPU 31 selects the coolant temperature map shown in FIG. 3C when the engine information acquired in step S11 represents ENG1 and selects the coolant temperature map shown in FIG. 3D when the engine information acquired in step S11 represents ENG2.

The CPU 31 next detects a signal outputted from the engine ECU 20 and representing the engine coolant temperature via the network interface circuit 34, and determines a complete combustion determination rotational speed NE determined for the engine coolant temperature represented by the detected signal based on the coolant temperature map selected in step S12 (step S13). For example, if the engine information represents ENG1 and the engine coolant temperature is 0° C., the complete combustion determination rotational speed NE is determined to be 1200 rpm with reference to the coolant temperature map shown in FIG. 3C. If the engine information represents ENG2 and the engine coolant temperature is 80° C., the complete combustion determination rotational speed NE is determined to be 800 rpm with reference to the coolant temperature map shown in FIG. 3D.

Next, the CPU 31 detects a signal outputted from the engine ECU 20 and representing the engine rotational speed via the input interface circuit 35 (step S14), and determines whether or not the engine rotational speed represented by the detected signal is equal to or higher than the complete combustion determination rotational speed NE determined in step S13 (step S15).

If the engine rotational speed is lower than the complete combustion determination rotational speed NE, the CPU 31 determines whether or not the start button 12 has been released based on a signal from the start button 12 (step S16).

If it is determined that the start button 12 has not been released yet, the CPU 31 performs steps S14 to S16 again.

If it is determined that the engine rotational speed is equal to or higher than the complete combustion determination rotational speed NE in step S15 or it is determined that the start button 12 has been released in step S16, the CPU 31 determines that the engine 1 has reached a complete combustion state and terminates cranking of the engine 1 (step S9). That is, the CPU 31 turns off the starter motor relay switch circuit 42 to stop the starter motor 11.

As described above, since the power management ECU 30 according to this embodiment determines whether or not the complete combustion has been achieved using a coolant temperature map associated with the engine information on the engine 1 mounted in the vehicle among a plurality of coolant temperature maps stored previously therein in association with engine information, the power management ECU 30 can be used generally in vehicles equipped with different types of engines.

That is, since the power management ECU 30 according to this embodiment changes the coolant temperature map for use in determining whether or not the complete combustion has been achieved based on the engine information acquired from the engine ECU 20 when performing a cranking hold control operation, the power management ECU 30 can change the control pattern dynamically depending on the type of the engine.

Also, the power management ECU 30 according to this embodiment can be used generally in vehicles equipped with different types of engines. Therefore, the development costs can be decreased since there is no need to develop a power management ECU for a different type of an engine, and the workload of the inspection can be reduced since the procedure of quality inspection can be standardized.

An example in which the engine starting switch of the present invention is constituted of a push-type start button 12 is described in this embodiment; however the engine starting switch may be a mechanical ignition switch.

Also, although it is described in this embodiment that the power management ECU 30 selects a coolant temperature map depending on whether the start button 12 is pressed for a short period of time or a long period of time and performs a cranking hold control operation, the engine ECU 20 may store coolant temperature maps for use in the case of a long button press and perform the cranking hold control operation to be performed in response to a long button press, and the power management ECU 30 may store coolant temperature maps for use in the case of a short button press and perform the cranking hold control operation to be performed in response to a short button press. Alternatively, the engine ECU 20 may store coolant temperature maps for use in the case of a short button press and perform the cranking hold control operation to be performed in response to a short button press, and the power management ECU 30 may store coolant temperature maps for use in the case of a long button press and perform the cranking hold control operation to be performed in response to a long button press.

Also, as described before, the power management ECU 30 for performing the cranking hold control operation to be performed in response to a long button press may be installed only in a vehicle which is provided with a start button and thus requires a cranking hold control operation to be performed in response to a long button press of the start button and may not be installed in a vehicle having no start button. In other words, the power management ECU 30 can be provided only in easily vehicles provided with a start button depending on the preference of the driver or the grade of the vehicle irrespective of the type of the engine.

As has been described above, the start control device for a vehicle according to the present invention can be installed generally in vehicles equipped with different types of engines, and is useful as a start control device for a vehicle in which a cranking hold control operation is performed.

What is claimed is:

1. A start control device for a vehicle comprising:

an operation detection device that detects a signal from an engine starting switch for starting a first engine mounted in a vehicle;

a rotational speed detection device that detects engine rotational speed of the first engine;

a coolant temperature detection device that detects coolant temperature in the first engine;

a storage device that stores a first coolant temperature map in which first determination rotational speeds for use in determining whether or not the first engine has achieved complete combustion are determined for several coolant temperatures in the first engine, and a second coolant temperature map in which second determination rotational speeds for use in determining whether or not a second engine has achieved complete combustion are determined for several different coolant temperatures in the second engine;

a complete combustion determination device that determines that the first engine is in a complete combustion state when the rotational speed of the first engine reaches one of the first determination rotational speeds that is determined for the coolant temperature detected at the start of the first engine in the first coolant temperature map;

a starter motor control device that controls a starter motor to cause the starter motor to crank the first engine from the time when the operation detection device detects the signal until the complete combustion determination device determines that the first engine is in a complete combustion state; and an information acquisition device that acquires first engine information on the first engine, wherein the storage device has stored the first coolant temperature map and the second coolant temperature map associated with the first engine information and second engine information, respectively, and wherein, when the information acquisition device acquires the first engine information, the complete combustion determination device selects the first coolant temperature map associated with the first engine information and determines that the first engine is in the complete combustion state based on the first coolant temperature map.

2. The start control device for a vehicle according to claim 1, wherein the storage device also stores third coolant temperature map in which third determination rotational speeds for use in determining whether or not the first engine has achieved complete combustion are determined for several coolant temperatures in the first engine, the third determination rotational speeds being respectively higher than the first determination rotational speeds, and fourth coolant temperature map in which fourth determination rotational speeds for use in determining whether or not the second engine has achieved complete combustion are determined for several coolant temperatures in the second engine, the fourth rotational speeds being respectively higher than the second determination rotational speeds;

the storage device has stored the third coolant temperature map and the fourth coolant temperature map in association with the first engine information and second engine information, respectively, and wherein, when the operation detection device has detected the signal for at least a predetermined period of time and the information acquisition device acquires the first engine information, the complete combustion determination device selects the third coolant temperature map associated with the first engine information out of the first to fourth coolant temperature maps and determines that the first engine is in the complete combustion state based on the third coolant temperature map.

3. The start control device for a vehicle according to claim 2, wherein the starter motor control device controls the starter motor to cause the starter motor to crank the first engine from the time when the signal is detected until the first engine is determined to be in a complete combustion based on the third coolant temperature map or the signal is no longer detected.

4. The start control device for a vehicle according to claim 1, wherein the engine starting switch includes a push-type start button or mechanical ignition switch.

5. A method for controlling a start control device for a vehicle, wherein a first coolant temperature map in which first determination rotational speeds for use in determining whether or not a first engine mounted in a vehicle has achieved complete combustion are determined for several coolant temperatures in the first engine and a second coolant temperature map in which second determination rotational speeds for use in determining whether or not a second engine has achieved complete combustion are determined for several different coolant temperatures in the second engine are stored in the start control device, the method comprising:

detecting a start command to the first engine;

starting cranking of the first engine;

acquiring first engine information on the first engine;

selecting the first coolant temperature map corresponding to the first engine information out of the first aid second coolant temperature maps and determining one of the first determination rotational speeds that corresponds to the coolant temperature at the start of the first engine based on the first coolant temperature map; and terminating the cranking when the rotational speed of the first engine becomes equal to or higher than the one of the first determination rotational speeds.

6. The method for controlling the start control device for a vehicle according to claim 5, wherein a third coolant temperature map in which third determination rotational speeds for use in determining whether or not the first engine has achieved complete combustion which are respectively higher than the first determination rotational speeds and a fourth coolant temperature map in which fourth determination rotational speeds for use in determining whether or not the second engine has achieved complete combustion which are respectively higher than the second determination rotational speeds are also stored in the start control device, the method further comprising:

selecting the third coolant temperature map out of the first and third coolant temperature maps corresponding to the first engine information when the duration of a start command to the first engine is longer than a predetermined period of time;

determining one of the third determination rotational speeds that corresponds to the coolant temperature at the start of the first engine based on the third coolant temperature map; and terminating the cranking when the rotational speed of the first engine becomes equal to or higher than the one of the third complete combustion determination rotational speed.

7. The method for controlling the start control device for a vehicle according to claim 6, further comprising:

determining whether or not the start command to the first engine is being continued when the rotational speed of the first engine is lower than the one of the third determination rotational speeds; and terminating the cranking when it is determined that the start command to the first engine is not being continued.

8. The method for controlling the start control device for a vehicle according to claim 6, further comprising:

selecting the first coolant temperature map out of the first and third coolant temperature maps corresponding to the first engine information when the duration of a start command to the first engine is equal to or shorter than the predetermined period of time.

* * * * *